United States Patent Office 2,698,846
Patented Jan. 4, 1955

2,698,846
HETEROCYCLIC COMPOUNDS

John Thomas Plati, Rutherford, and Wilhelm Wenner, Upper Montclair, N. J., assignors to Hoffmann-La Roche Inc., Nutley, N. J., a corporation of New Jersey No Drawing. Application April 24, 1953,
Serial No. 351,020

5 Claims. (Cl. 260—260)

This invention relates to novel chemical compounds, having utility in therapeutics, e. g. as muscle relaxants in the treatment of spastic and neuro-muscular disorders, in consequence of their mephenesin-like activity, i. e. their depressant activity on the lower spinal nerve centers. These compounds can be identified as belonging to the class of 3-phenyl-2-pyrido[1,2-a]pyrimidine-2,4(3H)-dione and salts thereof with bases. Inasmuch as 3-phenyl-2-pyrido[1,2-a]pyrimidine-2,4(3H)-dione is capable of keto-enol tautomerism, it will be understood that the invention includes all the tautomeric forms of the compound. In the keto form, 3-phenyl-2-pyrido[1,2-a]pyrimidine-2,4(3H)-dione can be represented by the formula:

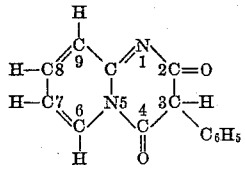

The compound of the above formula can be prepared by condensing a di-lower alkyl ester of α-phenylmalonic acid with 2-aminopyridine by heating a mixture of the reactants, either as such or dissolved in an inert organic solvent. A preferred method comprises heating a mixture of diethyl α-phenylmalonate with 2-aminopyridine, dissolved in an inert organic solvent, preferably diphenyl ether, so as to distill off the ethyl alcohol formed by the condensation reaction, and then separating the condensation product from the reaction mixture. Salts can be obtained by reacting 3-phenyl-2-pyrido[1,2-a]pyrimidine-2,4(3H)-dione with bases, e. g. sodium hydroxide, tetramethylammonium hydroxide, ethylamine and similar inorganic and organic bases.

The invention is further disclosed in the following examples, which are illustrative but not limitative thereof. Melting points stated are uncorrected.

Example 1

In a round bottom flask provided with a reflux condenser, 189 g. of diethyl α-phenylmalonate and 75 g. of 2-aminopyridine were heated by means of an oil bath to about 160–175° C. The top of the reflux condenser was connected to a vacuum pump. A vacuum of about 50–60 mm. was maintained during the heating period. As soon as the reaction started, ethyl alcohol was liberated, and it was necessary to adjust the temperature of the condenser so that only the alcohol was removed, and unchanged starting materials were returned to the reaction flask. A yellow solid formed gradually. After about 2½ hours, the reaction mixture was allowed to cool. When cold, the contents of the flask were digested with ether and filtered. 3-phenyl-2-pyrido[1,2-a]pyrimidine-2,4(3H)-dione remained on the filter. The product was yellow and melted at about 295–297° C. with decomposition.

For purposes of further purification, 10 g. of the above product were dissolved in a hot mixture of 85 ml. of acetic acid and 5 ml. of water. On standing, the purified compound separated in bright yellow crystals. They were filtered and dried. The melting point of the 3-phenyl-2-pyrido[1,2-a]pyrimidine-2,4(3H)-dione thus obtained was about 295–297° C. with decomposition.

Example 2

A mixture of 9.4 g. of diethyl α-phenylmalonate, 3.8 g. of 2-amino-pyridine, and 25 ml. of diphenyl ether was heated while stirring for 45 minutes to about 185–190° C. Yellow crystals formed gradually in the reaction mixture. After cooling, the product was filtered by suction. After washing with alcohol and ether, the material melted at about 295–297° C. with decomposition. It was identical with the product of Example 1.

Example 3

An aqueous suspension of 3-phenyl-2-pyrido[1,2-a]pyrimidine-2,4(3H)-dione was vigorously stirred. A solution of aqueous 50 per cent sodium hydroxide was added slowly until solution occurred. The resulting solution was diluted with about 3 times its volume of acetone. On standing, the sodium salt crystallized. It was filtered, washed with acetone and dried. The sodium salt is quite soluble in water.

Example 4

Twenty per cent aqueous ethylamine solution was slowly added to a stirred aqueous suspension of 3-phenyl-2-pyrido[1,2-a]pyrimidine-2,4(3H)-dione until a clear solution had formed. About 4 volumes of acetone were then added. On standing, the ethylamine salt crystallized. It was filtered, washed with acetone, and dried.

We claim:

1. A compound selected from the group consisting of 3-phenyl-2-pyrido[1,2-a]pyrimidine - 2,4(3H) - dione and non-toxic salts thereof with bases.
2. 3-phenyl-2 - pyrido[1,2-a]pyrimidine-2,4(3H)-dione.
3. A non-toxic salt of 3-phenyl-2-pyrido[1,2-a]-pyrimidine-2,4(3H)-dione with a base.
4. A method of making 3-phenyl-2-pyrido[1,2-a]pyrimidine-2,4(3H)-dione which comprises heating a di-lower alkyl ester of α-phenylmalonic acid with 2-aminopyridine.
5. An alkali metal salt of 3-phenyl-2-pyrido[1,2-a]pyrimidine-2,4(3H)-dione.

No references cited.